(12) United States Patent
Ledwon et al.

(10) Patent No.: US 11,547,976 B2
(45) Date of Patent: Jan. 10, 2023

(54) REACTOR FOR A CHEMICAL REACTION AND METHOD FOR CONTROLLING THE CHEMICAL REACTION

(71) Applicant: Heion GmbH, Siblin (DE)

(72) Inventors: Anton Ledwon, Troisdorf (DE); Waldemar Lewtschenko, Hennef (DE)

(73) Assignee: HEION GMBH, Siblin (DE)

( * ) Notice: Subject to any disclaimer, the term of this patent is extended or adjusted under 35 U.S.C. 154(b) by 0 days.

(21) Appl. No.: 17/292,824

(22) PCT Filed: Jul. 9, 2019

(86) PCT No.: PCT/EP2019/068364
§ 371 (c)(1),
(2) Date: May 11, 2021

(87) PCT Pub. No.: WO2020/098984
PCT Pub. Date: May 22, 2020

(65) Prior Publication Data
US 2022/0016588 A1 Jan. 20, 2022

(30) Foreign Application Priority Data
Nov. 12, 2018 (EP) .................................. 18205787

(51) Int. Cl.
*B01J 4/00* (2006.01)
*B01J 19/00* (2006.01)
*B01J 19/26* (2006.01)

(52) U.S. Cl.
CPC ............... *B01J 4/002* (2013.01); *B01J 4/007* (2013.01); *B01J 4/008* (2013.01); *B01J 19/0033* (2013.01); *B01J 19/26* (2013.01)

(58) Field of Classification Search
CPC ........ B01J 19/26; B01J 19/0033; B01J 4/002; B01J 4/007; B01J 4/008
See application file for complete search history.

(56) References Cited

U.S. PATENT DOCUMENTS
2007/0212294 A1 9/2007 Kang et al.

FOREIGN PATENT DOCUMENTS
DE 102016109639 11/2017
EP 3266744 1/2018

*Primary Examiner* — Lessanework Seifu
(74) *Attorney, Agent, or Firm* — Burr & Forman LLP; Douglas L. Lineberry

(57) ABSTRACT

A reactor for a chemical reaction, comprising a housing and a reaction chamber, a nozzle member with an inlet for letting at least one reactant flow into the reaction chamber, wherein the nozzle member is mounted in a movable manner relative to the housing, a sensor device and an adjusting device influencing the movement of the nozzle member can be adjusted, a control unit configured for receiving from the sensor device a measurement signal of the sensor device based on the measuring quantity and generating a control signal for the adjusting device depending on the measurement signal.

15 Claims, 4 Drawing Sheets

REACTOR FOR A CHEMICAL REACTION AND METHOD FOR CONTROLLING THE CHEMICAL REACTION

A reactor with a reaction chamber and a housing enclosing the reaction chamber is known from DE 10 2016 109 639 A1. A first reactant is fed into the reaction chamber via a nozzle member. Another nozzle member feeds a second reactant into the reaction chamber, wherein the two reactants collide with each other with great kinetic energy. According to DE 10 2016 109 639 A1, the kinetic energy is used in this case for the atomic or molecular restructuring of at least one of the two reactants. The reactants may be water and a liquid hydrocarbon, such as diesel fuel, for instance. One intended product of the chemical reaction taking place in the reaction chamber, i.e. of the atomic or molecular restructuring of at least one of the reactants, is a modified diesel fuel with which a particularly low-emission combustion is possible. Particularly where use in internal combustion engines is concerned, there is a great demand for such fuels because the emission limits for motor vehicles are becoming stricter and stricter.

Generally, atomic or molecular restructuring is accompanied by an energy input or a loss of chemically bound energy so that the above-mentioned chemical reaction of water and diesel fuel for generating a modified diesel fuel with improved properties, for example, may result in high production costs or an unfavorable environmental balance for the modified diesel fuel. Particularly if the chemical reaction has only a small yield, it may be that the advantages of the modified diesel fuel do not justify the increased expenditure for its production.

It is therefore the object of the invention to provide a reactor in which high-yield chemical reactions are made possible with low energy expenditure.

The object on which the invention is based is achieved with the combination of features according to claim 1. Exemplary embodiments of the invention are apparent from the claims dependent on claim 1.

The nozzle member of the reactor according to the invention has an inlet for letting at least one reactant flow into the reaction chamber of the reactor, wherein the nozzle member is mounted in a movable manner relative to the housing of the reactor. The reactor comprises a sensor device by means of which at least one measuring quantity can be detected during the chemical reaction taking place in the reaction chamber of the reactor. At least one mounting parameter can be adjusted by means of an adjusting device. The manner in which the nozzle member is mounted can be described by means of the mounting parameter and possibly by means of further mounting parameters. How the nozzle member can be moved relative to the housing and which movement or form of movement results during the chemical reaction is then dependent thereon. The movement of the nozzle member can be induced or influenced by the chemical reaction or by process parameters, such as pressures, temperatures, flow velocities etc.

The reactor according to the invention further comprises a control unit configured for receiving from the sensor device a measurement signal of the sensor device based on the measuring quantity. The control unit can then generate a control signal for the adjusting device depending on the measurement signal. As a result, it is possible to adjust the at least one mounting parameter by means of the adjusting device depending on the measuring quantity detected by the sensor device.

The control unit may include a processor in which the function between the input measurement signal and the output control signal is stored in a memory. In this case, the output control signal may depend on further influencing quantities that are detected during the chemical reaction and supplied to the control unit as additional influencing signals.

In an exemplary embodiment, the sensor device has a sensor for detecting a frequency with which the nozzle member oscillates. The sensor for frequency detection, which may be configured as a sound sensor, then transmits a measurement signal corresponding to the detected frequency to the control unit, which defines or computes a control signal on the basis of this measurement signal and transmits the former to the adjusting device. The mounting parameter is readjusted by means of the adjusting device in accordance with the control signal, which affects the movement, in this exemplary embodiment the frequency, of the nozzle member.

Surprisingly, it was found that the yield of degree of efficiency of the chemical reaction can be optimized by adjusting the frequency. It was also found that, by adjusting the frequency with which the nozzle member oscillates, the course of the chemical reaction can be influenced in such a manner that different products are created.

In an exemplary embodiment, a first stop and a second stop for the nozzle member are provided, between which the nozzle member can move. In this case, a distance between the first stop and the second stop constitutes an adjustable mounting parameter. The oscillation amplitude of the nozzle member moving back and forth between the first stop and the second stop can be adjusted by means of the distance between the two stops for the nozzle member, which has an effect on its frequency.

Preferably, only one of the two stops is configured as a movable stop, whereas the other stop is stationary and is incapable of being moved. A movable adjusting member as a part of the adjusting device may include this movable stop. In one exemplary embodiment, the adjusting member is a threaded member whose axial position can be adjusted by rotating it. In this case, the movable stop preferably acts in the axial direction of the threaded member. If the pitch of the thread of the threaded member is very small, the axial position of the threaded member and thus the effective position of the movable stop can be adjusted very accurately.

The distance between the first stop and the second stop for the nozzle member may extend parallel to a main flow direction with which the reactant flows through the nozzle member. In this exemplary embodiment, the nozzle member thus moves parallel to this main flow direction, i.e. either in the main flow direction or in the opposite direction, i.e. shifted by 180° relative to the main flow direction.

The distance between the stops results in a mounting with play of the nozzle member, wherein the play of the mounting leads to the necessary freedom of movement of the nozzle member. The play may have values of 0.01 to 3 mm, preferably 0.2 to 2 mm.

As a result, the nozzle member may be considered a part of a oscillating system comprising an oscillating mass and a spring damping system, wherein the spring damping system is defined by the type of mounting of the nozzle member in the housing and influences the oscillation behavior of the nozzle member. For example, a soft or tight mounting of the nozzle member may be provided, wherein a force with which the nozzle member is clamped into the housing may also be considered a possible mounting parameter, which may be adjusted by means of the adjusting device in order to influence the movement of the nozzle member. Thus, a clamping force may be varied by means of the adjusting device.

The nozzle member may have an outlet, wherein a flow cross-section of the outlet is greater than a flow cross-section of the inlet. In one exemplary embodiment, the flow cross-section of a nozzle duct (flow duct between the entrance and the exit) increases continuously starting from the inlet. It is also possible that the flow cross-section forms a minimum (in the form of a constricted portion, wherein the flow cross-section of this constricted portion is in each case smaller than the flow cross-sections of the inlet and outlet) or a maximum between the inlet and the outlet.

The nozzle duct may have the shape of a truncated cone. An opening angle of the truncated cone may have values of between 20 and 70°, 30 to 60° or preferably 40 to 50°. In this case, the opening angle is the angle between the cone envelope and the central axis of the truncated cone.

For example, the inlet of the nozzle member may be supplied with a pressurized mixture of two reactants, so that the mixture is pressed through the inlet and then flows through the nozzle member at high velocity. For example, the reactants may be water and a liquid hydrocarbon.

Due to the greater flow cross-section of the outlet and the accompanying pressure drop, bubbles may form in at least one reactant, which then collapse (cavitation) in the nozzle member between the inlet and the outlet or, viewed in the flow direction, behind the outlet of the nozzle member. Due to the moving nozzle member, changing, preferably alternating pressure conditions arise particularly between the inlet and the outlet of the nozzle member, wherein, according to the invention, these changing pressure conditions are exploited in such a manner that the phase of the implosion of the bubbles is stretched in time. In the process, the energy released during the collapse of the bubbles which, in the case of cavitation, otherwise remains unused as heat energy, for example, can be used in a targeted manner for the atomic or molecular restructuring of the at least one reactant. Thus, the oscillation of the nozzle member permits the targeted use of the energy released during cavitation for the chemical reaction.

The reaction chamber is to also include the space located between the inlet and outlet within the nozzle member. Thus, the reaction chamber also includes the nozzle duct. Without being bound to this theory, it is assumed that a not inconsiderable part of the chemical reaction already takes place in the nozzle duct, i.e. between the inlet and the outlet of the nozzle member.

The nozzle member may be configured as a preferably circular disk. The disk may have a central opening. The inlet is disposed in the plane of a first base surface of the disk, the outlet is disposed in an opposite second base surface. Preferably, the nozzle member is a substantially rotationally symmetric body, with the central opening being formed coaxially with the central axis.

In one exemplary embodiment, the nozzle member separates the reaction chamber from a pre-chamber. The pre-chamber serves for supplying to the inlet of the nozzle member the at least one reactant for the chemical reaction or the mixture of several reactants. In this case, the reactant or the mixture is under pressure in the pre-chamber and arrives in the reaction chamber through the inlet of the nozzle member. Hereinafter, only the term "reactant" is used for the reactant and for the mixture.

In one exemplary embodiment, the nozzle member not only serves for feeding the reactant into the reaction chamber, but also for providing for alternating pressure conditions in the reaction chamber, with which the course of the cavitation (formation of gas bubbles and their implosion) is influenced and controlled. The design of the nozzle member, whose mass is the oscillating mass of the above-described oscillating system, to a decisive extent depends, as well as on the design of the nozzle duct, also on the outer shape of the nozzle member, for example in order to realize a predetermined value for the mass/oscillating mass of the nozzle member.

The nozzle member may consist of a material whose density is greater than 5 g/cm$^3$, preferably greater than 8 g/cm$^3$. Iron or brass, for example, may be possibilities for the material of the nozzle member. In one embodiment, a ratio of the mass of the nozzle member (measured in g) to the flow cross-section of the inlet (measured in mm$^2$) takes on values between 30 and 100, 40 to 80, or 50 to 70. If, for example, the diameter of a circular flow cross-section of the inlet is 2 mm and the mass of the nozzle member is 150 g, this yields a ratio mass/flow cross-section of 48 g/mm$^2$.

A ratio of a projected total surface area of the flow cross-section of the inlet may have values of between 500 and 3000, preferably between 1000 and 2000, wherein this total surface area is to correspond to the surface area of the nozzle member projected into the plane of the flow cross-section of the inlet. If, for example, the nozzle member is a circular disk with a diameter of 80 mm, with the diameter of the circular inlet of the nozzle member being 2 mm, this yields a ratio of the projected total surface area to the flow cross-section of the inlet of 1600 ($80^2/2^2$).

In one exemplary embodiment, the nozzle member is attached to the housing via a peripherally extending diaphragm. If the nozzle member is configured as a circular disk, the peripherally extending diaphragm may be a ring. The peripherally extending diaphragm may be firmly connected to the housing with an outer portion, whereas it is firmly connected to the nozzle member with an inner portion. Then, the nozzle member is mounted in a movable manner relative to the housing due to the elasticity of the diaphragm. The diaphragm may have the additional function of sealing the reaction chamber with respect to the pre-chamber.

The diaphragm may consist of an elastic material, e.g. of rubber or an elastomer. The assembly consisting of the diaphragm, the housing and the nozzle member may be chosen such that the diaphragm is under a certain mechanical tension in the non-operating state of the reactor. It is possible to readjust or control this tension during the operation of the reactor depending on the measuring quantity detected during the chemical reaction.

The reactor may have an adjusting member with a needle-shaped tip, which is disposed in front of the inlet of the nozzle member or protrudes into the inlet of the nozzle member. The position of the needle-shaped tip relative to the inlet of the nozzle member can be adjusted in one exemplary embodiment. By means of this adjustment, the yield of the chemical reaction or the quality of the products produced by the chemical reaction can be influenced.

The adjusting member may have a duct for supplying another reactant. Thus, another fluid (liquid, gaseous or as a flowable solid in the form of small particles) can be introduced from the adjusting member into the nozzle duct, in addition to the reactant from the pre-chamber.

Surfaces structures may be incorporated in the vicinity of the inlet, for example—in the case of the exemplary embodiment with the circular disk as a nozzle member—on the first base surface facing towards the pre-chamber. In one exemplary embodiment, these surface structures are disposed around the inlet. In this case, the surface structures may be configured in the form of radially extending notches. The notches or furrows may also be disposed around the inlet in a spiral shape. It was found that, due to the surface structures, the flow conditions (increased turbulence) in front of the nozzle member change such that the yield of the chemical reaction can be increased.

Another object of the invention, namely providing a method for controlling a chemical reaction with the goal of a high yield with as small an energy input as possible, is achieved by the combination of features according to claim 12. Exemplary embodiments of the method of the invention are apparent from the claims dependent on claim 12.

The above-described reactor can be used in the method according to the invention. In the method according to the invention, the nozzle member executes an oscillating movement during the reaction, wherein at least one parameter of the oscillating movement is being detected and wherein the chemical reaction is controlled on the basis of the detected oscillation parameter. In one exemplary embodiment, the oscillation parameter is the frequency of the oscillating movement of the nozzle member. In one exemplary embodiment, a target value for the frequency is between 16 and 20,000 Hz, 100 to 10,000 Hz, or 1000 to 5000 Hz. It is also possible for the frequency to be in the ultrasound range, with frequencies in excess of 20,000 Hz being assumed for this case (e.g. 20,000 Hz to 100 kHz).

The method may provide that the oscillating movement is stopped by the above-described first stop for the nozzle member and the above-described second stop for the nozzle member, wherein the distance between the first stop and the second stop is being varied or adjusted in order to control the reaction.

In one exemplary embodiment, the position of the needle-shaped body relative to the inlet of the nozzle member is changed in order to control the chemical reaction.

By means of the device according to the invention or the method according to the invention, it is possible, in the case of a liquid hydrocarbon (such as diesel fuel, for instance) to bond oxygen to the carbon chains in such a way that the diesel fuel retains oxidation stability. The oxygen is chemically bonded to the hydrocarbon as a hydroxyl or carboxyl.

During combustion in the internal combustion engine, this oxygen drops to a lower oxidation state and forms the usual combustion products $H_2O$ and $CO_2$. During the combustion in the internal combustion engine, the $H_2O$ formed transitions into the vapor phase, whereby mechanical energy is generated in the cylinder of the internal combustion engine together with the release of thermal energy due to the combustion.

Due to the additional chemically bonded oxygen atoms, the diesel fuel burns with less emission at high degrees of efficiency. In particular, $NO_x$ emissions can be reduced already during combustion by means of the diesel fuel modified in this manner.

Without being bound to this theory, a splitting of the water molecules takes place in the method according to the invention, during which radical hydroxyl ions are produced that form new chemical structures together with the hydrocarbon molecules. When the water molecules are split, the gas phase is avoided and the reaction material remains in a liquid state. Thus, this reaction requires relatively little energy input. It was found that, immediately after the process of change, the processed material has a radical character. Due to the further treatment, the radical structures are converted by oxidation into stable structures. The radical chemical state can be stabilized by adding oxygen, hydrogen, $CO_2$, methane and other gases and liquids. This makes it possible to provide the diesel fuel with more favorable properties. Thus, this method is based on the artificial radicalization of the reactants and the stabilization through oxidation.

The method can also be used where emulsions are being used (e.g. in the cosmetics and food industries). Due to the method, the use of otherwise necessary additives, such as surfactants, for example, can be reduced or even avoided.

The invention is explained in more detail with reference to the exemplary embodiments shown in the figures. In the Figures:

FIG. 1 schematically shows a reactor according to the invention;

Figure 1:
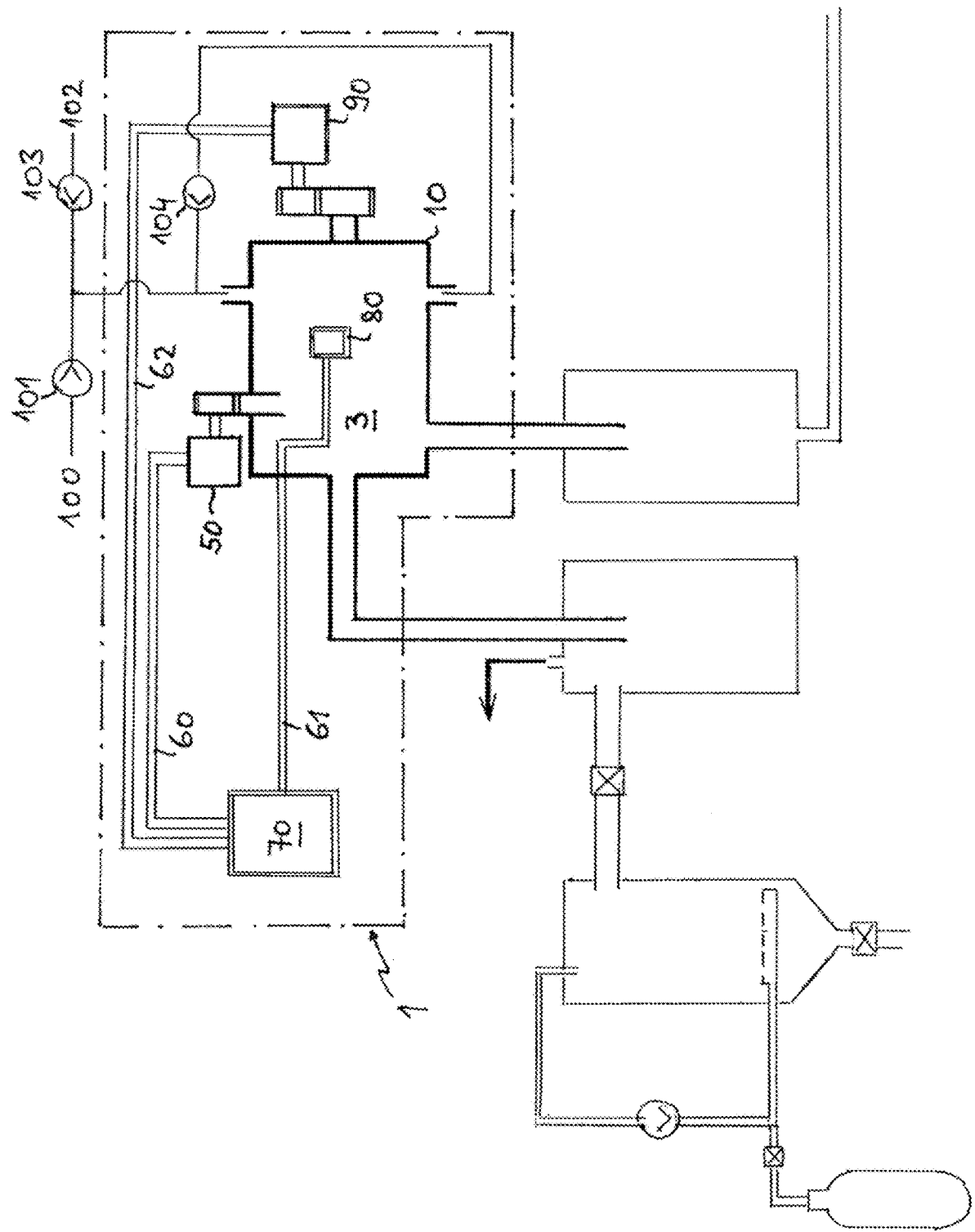

FIG. 1 schematically shows a reactor designated in its entirety with 1. In this case, the reactor 1 is to include those components that are located within the chain dotted line. The reactor includes a housing 10 and a reaction chamber 3 enclosed by the housing 10. A nozzle member is arranged in a movable manner relative to the housing 10. This nozzle member is not shown in FIG. 1, but in FIGS. 2 and 3, and there is given the reference numeral 30. An adjusting device 50 serves for adjusting a mounting parameter for the movably mounted nozzle member 30. In this exemplary embodiment, the mounting parameter is a play which provides for a certain mobility of the nozzle member 30, so that it can move back and forth or execute an oscillating movement.

The adjusting device 50 is connected to a control unit 70 via a signal line 60. The sensor device 80 detects at least one frequency with which the nozzle member oscillates. The sensor device 80 feeds the detected frequency or a measurement signal based on the detected frequency to the control unit 70 via a signal line 61. Based on the measurement signal of the sensor device 80, the control unit 70 determines a control signal for the adjusting device 50, which is transmitted via the signal line 60. Thus, the control unit 50 controls the frequency of the nozzle member 30.

Moreover, the reactor comprises a second adjusting device 90 with which an axial position of a needle-shaped tip (see reference numeral 92 in the FIGS. 2 and 3) relative to the nozzle member 30 can be adjusted. More details in this regard can be gleaned from the description of the FIGS. 2 and 3. The adjusting device 90 is connected to the control unit 70 via a signal line 62. Thus, an axial position of the needle-shaped tip can also be adjusted by means of the control unit 70.

A first reactant 100 is supplied to the housing 10 of the reactor 1 via a pump 101. Moreover, a pump 103 pumps a second reactant 102 for the chemical reaction taking place in the reactor into the housing 10. The reactant 100 and the reactant 101 are brought together outside the reactor 1, so that a mixture of the reactants 100 and 101 reaches the reactor 1. A pump 104 ensures that the part of the mixture that has not taken part in the chemical reaction is resupplied to the housing 10 in a circuit. The reactant 100 may be water. The reactant 102 may be a common diesel fuel.

The further elements depicted outside the chain dotted line serve for post-processing the products of the chemical reaction or collecting leaked material. Post-processing is not part of the invention and is therefore not described in any more detail.

Figure 2:
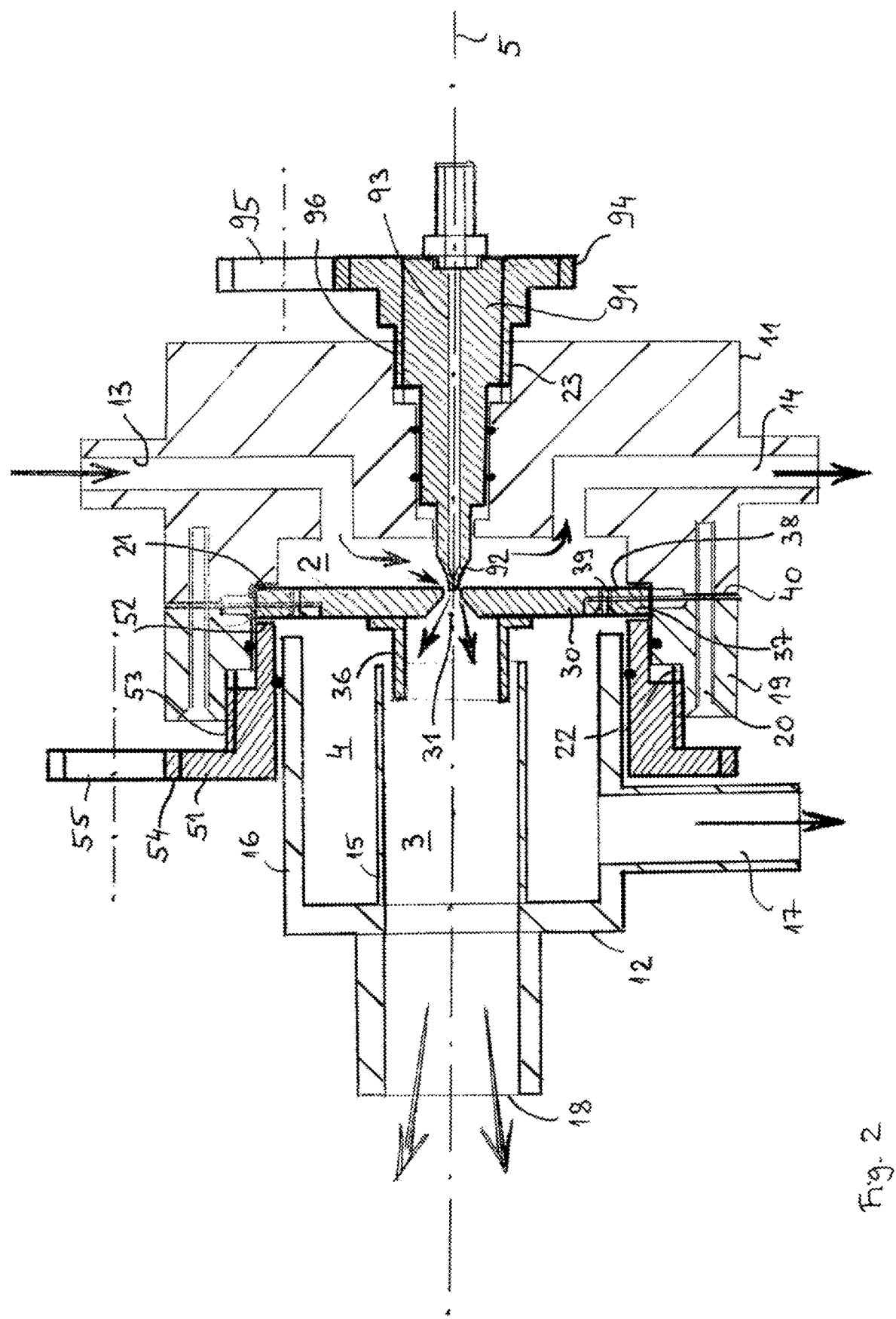
FIG. 2 shows a longitudinal section of parts of the reactor according to the invention.
Figure 3:
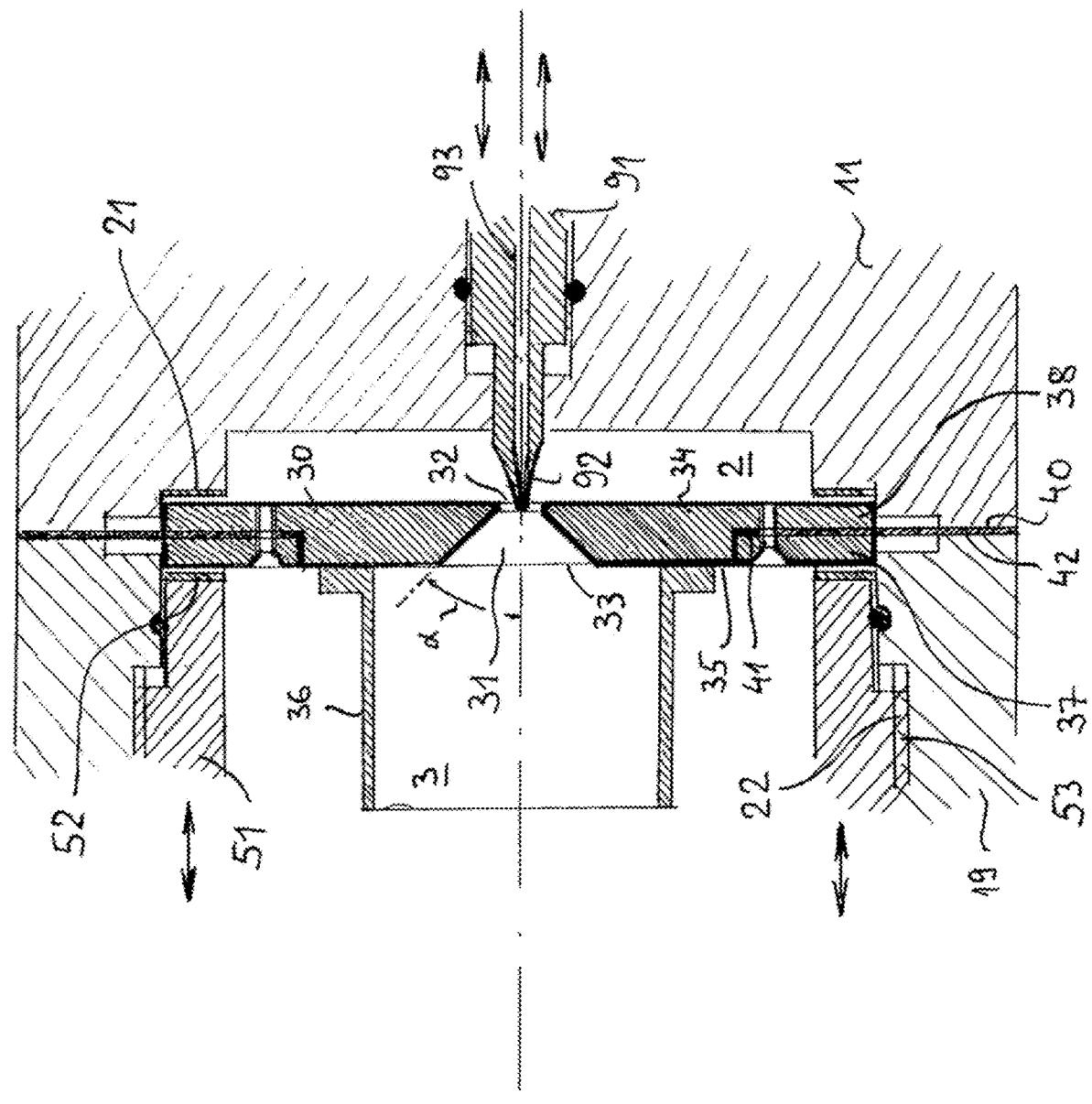
FIG. 3 shows an enlarged section from FIG. 1.

FIG. 2 shows a longitudinal section parts of the reactor 1, wherein FIG. 3 shows an enlarged portion of FIG. 3. In this case, FIG. 3 does not show all the features of FIG. 2, or slightly modified components. The housing 10 comprises a first housing part 11 and a second housing part 12. A nozzle member 30 is movably mounted in the housing 10. In the exemplary embodiment shown in FIGS. 2 and 3, the nozzle member 30 can be moved back and forth towards the left and the right in the plane of the drawing.

The nozzle member 30 is configured as a circular disk having a central bore 31. The central bore 31 is disposed coaxially with a central axis 5 of the reactor 1. The central bore 31 defines an inlet 32 and an outlet 33 of the nozzle member 30 and may also be referred to as a nozzle duct (see FIG. 3). It is discernible that a circular flow cross-section of the inlet 32 is smaller than a circular flow cross-section of the outlet 33. The flow cross-section of the outlet 33 (calculated in unit areas, independent of the shape of the flow cross-section) may be greater by the factor 4 or more than the flow cross-section of the inlet 32. A main flow direction through the nozzle duct 31 extends parallel to the central axis 5.

The mounting of the nozzle member 30 has a little play which permits the reciprocating movement of the nozzle member 30 parallel to the central axis 5.

The nozzle duct 31 has the shape of a truncated cone. An opening angle of the truncated cone designated a in FIG. 3 is about 45°.

The nozzle member 30 has a first base surface 34 and a second base surface 35 spaced apart therefrom. The distance of the first base surface 34 from the second base surface 35 in this case corresponds to a thickness of the nozzle member 30. The thickness may be 1 to 10 mm, for example.

As can be seen in FIG. 2, the first housing part 11 forms an inlet duct 13 through which the mixture of the reactants 100 and 102 for the chemical reaction is fed into a pre-chamber 2 (the inlet duct is not shown in FIG. 3). In this case, the pre-chamber 2 is delimited by the first housing part 11 and the nozzle member 30. Through the inlet 32, the pressurized mixture of water and diesel fuel arrives in the nozzle duct 31, which leads into a reaction chamber 3. The nozzle duct 31 is supposed to be a part of this reaction chamber 3 so that in the narrower sense, viewed in the flow direction of the mixture, the reaction chamber 3 already begins at the inlet 32 of the nozzle member 30. The part of the mixture that does not come through the inlet 32 leaves the pre-chamber 2 through an outlet opening 14 and is returned to the pre-chamber via the pump 104 (see FIG. 1).

The second housing part 12 enclosing the reaction chamber 3 has a cylindrical inner sleeve 15 and an outer sleeve 16 disposed coaxially therewith, wherein the inner sleeve 15 forms the actual wall of the reaction chamber 3. An annular chamber 4 between the inner sleeve 15 and the outer sleeve 16 serves for collecting water and diesel fuel that may escape because of the pre-chamber being imperfectly sealed. The collected leaked material is discharged from the annular chamber 4 through a discharge duct 17.

Moreover, the reaction chamber 3 is delimited by a sleeve-shaped attachment 36 which is placed coaxially on the second base surface 35 of the nozzle member 30. The attachment 36, which has a slightly reduced diameter compared to the diameter of the inner sleeve 15, serves for delimiting the reaction chamber 3 even better from the annular chamber 4.

An outlet opening 18, through which the products of the reaction taking place in the reaction chamber 3 can exit the reactor 1, is provided at an end of the substantially cylindrical reaction chamber 3 opposite the nozzle member 30.

The nozzle member 30 is held by an annular diaphragm 40. An inner portion 41 of the diaphragm 40 is clamped between a fastening ring 37 and a thickness-reduced peripherally extending edge 38 of the nozzle member 30. Threaded bores 39 are provided for accommodating fastening screws by means of which the inner portion 41 of the diaphragm 40 can be clamped between the fastening ring 36 and the edge 37.

An outer portion 42 is clamped between the first housing part 11 and an annular fastening flange 19. The outer portion 42 of the diaphragm can be fixed between the first housing part 11 and the fastening flange 19 by means of fastening screws that can be screwed into the threaded bores 20.

The above-mentioned play required for the reciprocating movement of the nozzle member 30 relative to the housing 10 is defined by an annular first stop 21 and an adjusting member 51 with a second stop 52. The axial position of the second stop 52 (parallel to the central axis 5) is variable due to the axial adjustability of the adjusting member 51. The adjusting member 51 is a part of the adjusting device 50 and configured as a threaded member. The threaded member has a male thread 53 that cooperates with a female thread 22 on the fastening flange 19. The adjusting member 51 has an outer toothing 54 meshing with a gear 55. When the gear 55 is rotated, this rotary movement is transmitted on to the adjusting member 51, resulting, due to the cooperation of the male thread 53 and the female thread 22 of the fastening flange 19, in an axial displacement of the adjusting member 51 and thus also in an axial displacement of the second stop 52 for the nozzle member 30. In other words, the play and thus the maximum amplitude for the nozzle member 30 can be adjusted by rotating the adjusting member 51.

In the first housing part 11, an axially movable further adjusting member 91 is provided coaxially with the central axis 5 as a part of the adjusting device 90 that comprises a needle-shaped tip 92 already mentioned above. In this case, the needle-shaped tip 92 reaches through the inlet 32 and thus protrudes into the nozzle duct 31. The adjusting member 91 has a duct 93 through which another reactant can be introduced into the nozzle duct 31 in addition to the mixture fed into the pre-chamber 2. The adjusting member 91 has an outer toothing 94 that is in engagement with a gear 95. A male thread 96 of the adjusting member 91 cooperates with a female thread 23 incorporated into the first housing part 11, so that a rotation of the gear 95 results in an axial displacement of the adjusting member 91. The axial position of the needle-shaped tip 92 with respect to the nozzle duct 31 can thus be adjusted by rotating the gear 95.

The mixture of water and diesel fuel arrives in the pre-chamber 2 under high pressure (e.g. 2 to 5 bars). In the process, the mixture is pressed through the inlet 32 into the nozzle duct 31, wherein, caused by the flow and pressure conditions prevailing in the nozzle duct 31 or the reaction chamber 3, gas bubbles are formed that then collapse again (cavitation). The nozzle member 30 is caused to oscillate by the flow and pressure conditions, wherein the play for the nozzle member 30 can be adjusted by the adjusting member 51. This in turn affects the frequency with which the nozzle member 30 can oscillate. Preferably, a resonance frequency is aimed at, so that the nozzle member 30 oscillates with the excitation frequency.

The energy released when the gas bubbles collapse is used for triggering the oscillating movement of the nozzle member 30.

The oscillating movement of the nozzle member 30 is thus triggered by the implosion of the gas bubbles. Since, according to the invention, the nozzle member 30 is configured to be movable, the oscillation energy of the nozzle member 30 acts primarily in two directions parallel to the central axis 5, that is, in the illustration of FIG. 2, towards the left in the direction of the main flow direction and opposite to the main flow direction, i.e. towards the right (back and forth). Through this process, the course over time of the implosion phase is changed. Since the implosion phase takes place in the microsecond or millisecond range, it is possible, according to the invention, to influence this phase. I.e. the method preferably has to be controlled in such a way that the oscillation goes into resonance. Two phases have to be distinguished:

a) Shortening the duration of the implosion phase: The shortening of the duration of the implosion phase that occurs when the nozzle member moves in the direction of the main flow direction causes the release of a higher energy, which is used for deconstructing molecular structures (breaking up the existing chemical structures). In this phase, the oscillation energy is used for the higher active energy.

b) Extending the duration of the implosion phase: The extension of the duration of the implosion phase, which occurs during a movement of the nozzle member 30 in the direction opposite to the main flow direction, is used for the (re-)structuring of the molecules because the structuring process requires a longer phase in time.

The oscillation of the nozzle member 30 may also be artificially (mechanically or electrically) excited (instead of by means of cavitation).

The oscillation amplitude of the nozzle member 30 may be modulated in such a way that the molecular structures are broken up in a reactor part and these broken-up molecular structures are re-structured in another reactor part.

An electrical potential may be applied between the needle-shaped tip 92 and the nozzle member 30. That may serve for accelerating the deconstruction process.

In the narrower sense, the invention uses cavitation, if at all, only for exciting the nozzle member 30. As soon as the intended frequency has been reached and the chemical reaction is adjusted, a cavitation in the sense of a disordered release of energy is no longer at hand. Rather, according to the invention, the release of the energy during the implosion of the gas bubbles is used in a targeted manner for restructuring at least one reactant.

Figure 4:
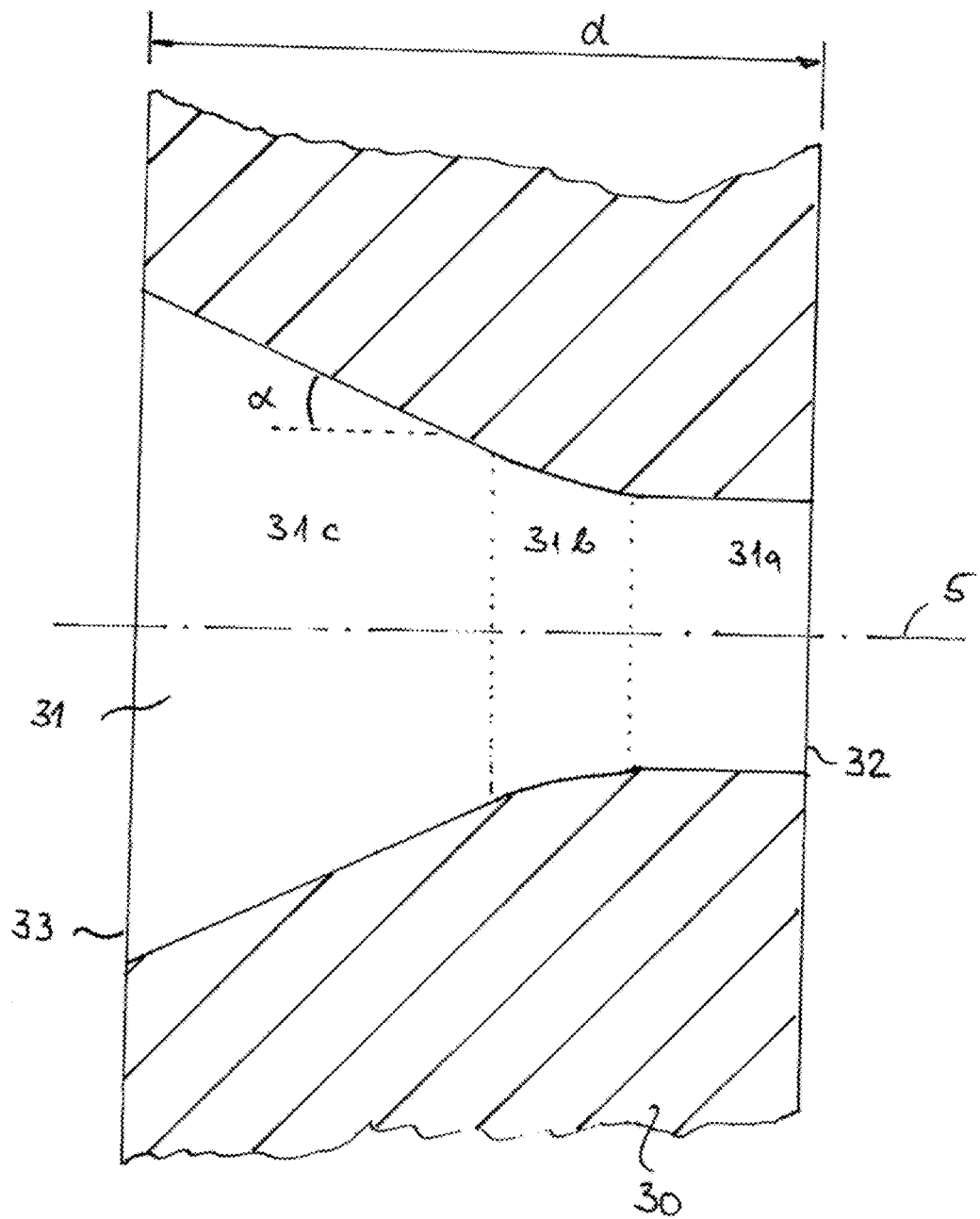
FIG. 4 shows the geometry of a nozzle duct.

FIG. 4 shows an exemplary embodiment of the geometry of the nozzle duct 31. Starting from the inlet 31, the nozzle duct 31 first has a first portion 31*a* with a constant or approximately constant flow cross-section, wherein an opening angle in this portion is 0° or 0° to 5°. The first portion is followed by a second portion 31*b*, which may also be referred to as a transitional portion. In this transitional portion, the almost non-existent opening angle of the first portion 31*a* transitions into the opening angle α in a third portion 31*c*. In this exemplary embodiment, the opening angle α is about 25°. In the third portion 31*c*, the opening angle α is constant along the length of the portion 31*c*. It is also possible that the opening angle becomes larger and larger towards the outlet 33.

In FIG. 4, the thickness of the nozzle member is designated by the letter d. The length of the first portion 31 (parallel to the central axis 5) may be 10 to 50% of the thickness d, e.g. 2 mm, with a thickness d of 5 mm. The length of the second portion 31*b* may be 5 to 30%. The length of the third portion 31*c* may be 20 to 85% of the thickness d.

LIST OF REFERENCE NUMERALS

1 Reactor
2 Pre-chamber
3 Reaction chamber
4 Annular chamber
5 Central axis
10 Housing
11 First housing part
12 Second housing part
13 Inlet duct
14 Outlet duct
15 Inner sleeve
16 Outer sleeve
17 Discharge duct
18 Outlet opening
19 Fastening flange
20 Threaded bore
21 First stop
22 Female thread
23 Female thread
30 Nozzle member
31 Bore/nozzle duct
32 Inlet
33 Outlet
34 First base surface
35 Second base surface
36 Attachment
37 Fastening ring
38 Edge
39 Threaded bore
40 Diaphragm
41 Inner portion
42 Outer portion
50 Adjusting device
51 Adjusting member
52 Second stop
53 Male thread
54 External toothing
55 Gear
60 Signal line
61 Signal line
62 Signal line
70 Control unit
80 Sensor unit
90 Adjusting device
91 Adjusting member
92 Needle-shaped tip
93 Duct
94 External toothing
95 Gear

What is claimed is:

1. A reactor (1) for a chemical reaction, comprising
a housing (10) and a reaction chamber (3);
a nozzle member (30) with an inlet (32) for letting at least one reactant flow into the reaction chamber (3), wherein the nozzle member (30) is mounted in a movable manner relative to the housing (10);
a sensor device (80) by means of which at least one measuring quantity can be detected during the chemical reaction;
an adjusting device (50) by means of which at least one mounting parameter influencing the movement of the nozzle member (30) can be adjusted; and
a control unit (70) configured for receiving from the sensor device (80) a measurement signal of the sensor device (80) based on the measuring quantity and generating a control signal for the adjusting device (50) depending on the measurement signal.

2. The reactor (1) according to claim 1, characterized in that the sensor device (80) has a sensor for detecting a frequency with which the nozzle member oscillates.

3. The reactor (1) according to claim 1, characterized in that a first stop (21) and a second stop (52) for the nozzle member (30) are provided, between which the nozzle member (30) can move, wherein the adjustable mounting parameter is a distance between the first stop (21) and the second stop (52).

4. The reactor (1) according to claim 3, characterized in that the distance extends parallel to the main flow direction with which the reactant flows through the nozzle member (30).

5. The reactor (1) according to claim 1, characterized in that the nozzle member (30) has an outlet (33), wherein a flow cross-section of the outlet (33) is greater than a flow cross-section of the inlet (32).

6. The reactor (1) according to claim 1, characterized in that the nozzle member (30) is configured as a disk with a central opening (31).

7. The reactor (1) according to claim 1, characterized in that the nozzle member (30) is attached to the housing (10) via a peripherally extending diaphragm (40).

8. The reactor (1) according to claim 1, characterized in that an adjusting member (91) with a needle-shaped tip (92) is provided, which is disposed in front of the inlet (32) of the nozzle member (30) or reaches through the inlet (32) of the nozzle member (30).

9. The reactor (1) according to claim 8, characterized in that the position of the needle-shaped tip (92) relative to the inlet (32) of the nozzle member (30) is adjustable.

10. The reactor (1) according to claim 8, characterized in that the needle-shaped tip (92) has a duct (93) for supplying the reactant or another reactant.

11. The reactor (1) according to claim 1, characterized in that surface structures are incorporated in the vicinity of the inlet (32) of the nozzle member (30).

12. A method for controlling a chemical reaction taking place in a reaction chamber (3) of a reactor, wherein the reactor (1) comprises a housing (10) and a nozzle member (30), which is mounted in a movable manner relative to the housing (10) and has an inlet (32) for letting at least one reactant flow into the reaction chamber (3), wherein the nozzle member (30) executes an oscillating movement during the reaction, wherein at least one oscillation parameter of the oscillating movement is detected, and wherein the reaction is controlled based on the detected oscillation parameter.

13. The method according to claim 12, characterized in that the oscillation parameter is a frequency of the oscillating movement of the nozzle member (30).

14. The method according to claim 12 or 13, characterized in that the oscillating movement is stopped by a first stop (21) for the nozzle member (30) and a second stop (52) for the nozzle member, wherein a distance between the first stop and the second stop is being varied in order to control the reaction.

15. The method according to claim 11, characterized in that a position, relative to the inlet (32) of the nozzle member (30), of a needle-shaped tip (92), which is disposed in front of the inlet of the nozzle member and/or protrudes at least partially into the inlet of the nozzle member, is changed in order to control the chemical reaction.

* * * * *